_United States Patent_ [19]

Mower

[11] Patent Number: 5,063,387

[45] Date of Patent: Nov. 5, 1991

[54] DOPPLER FREQUENCY COMPENSATION CIRCUIT

[75] Inventor: Vaughn L. Mower, Bountiful, Utah

[73] Assignee: Unisys Corporation, Blue Bell, Pa.

[21] Appl. No.: 439,907

[22] Filed: Nov. 20, 1989

[51] Int. Cl.$^5$ .......................................... H04L 27/30
[52] U.S. Cl. ................................. 342/103; 455/260; 375/1
[58] Field of Search ................ 342/99, 100, 102, 103; 455/260; 375/1

[56] References Cited

U.S. PATENT DOCUMENTS

| | | | |
|---|---|---|---|
| 3,769,589 | 10/1973 | Buntschuh et al. | 342/103 |
| 4,630,283 | 12/1986 | Schiff | 375/1 |
| 4,724,437 | 2/1988 | Jones et al. | 342/101 |
| 5,003,552 | 3/1991 | Mower | 375/1 |

_Primary Examiner_—Mark Hellner
_Attorney, Agent, or Firm_—John B. Sowell; Mark T. Starr; Thomas J. Scott

[57] ABSTRACT

In a communications data link network of the type having a plurality of ground stations and a single moving airborne station, there is provided a doppler frequency compensation circuit in each of the ground stations. The downlink carrier frequency is fixed and continuously broadcast to the receiving ground station which continuously receive the doppler shifted carrier signal. The ground stations are provided with coherent demodulators which provide a coherent I.F. recovered carrier signal that is applied to a scaling phase-locked loop to provide a deviation frequency signal that is applied to an inverting phase-locked loop which provides a pre-compensated uplink R.F. carrier signal. The uplink R.F. carrier signal has a compensated uplink doppler frequency component which equals the inverted and scaled doppler frequency of the received downlink carrier.

16 Claims, 3 Drawing Sheets

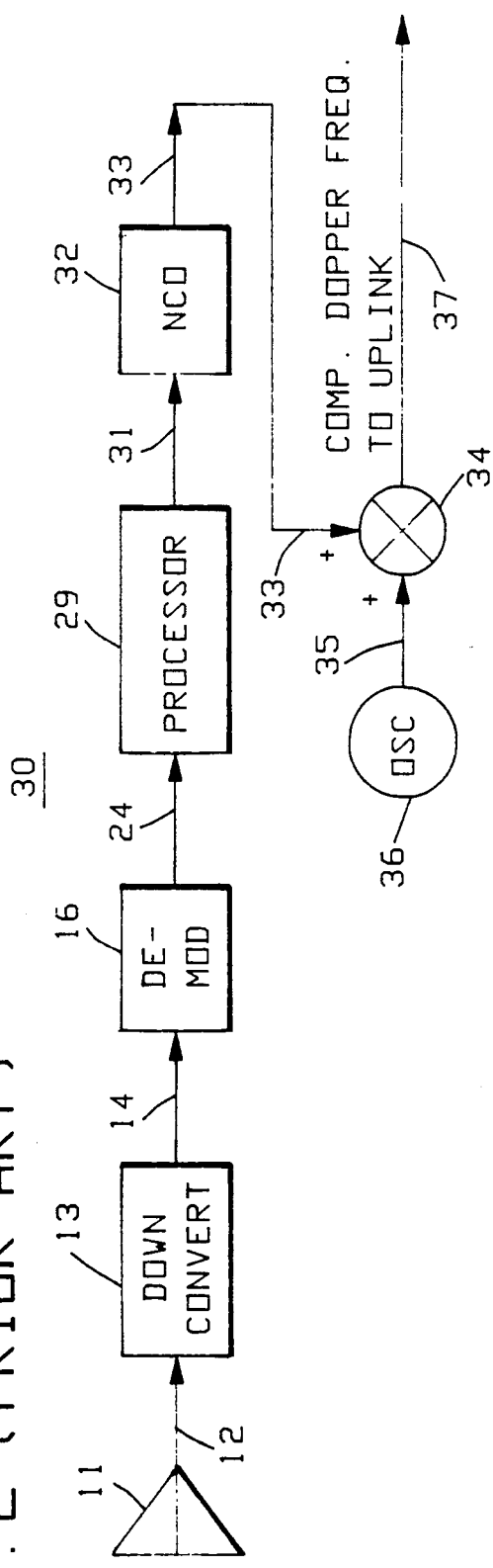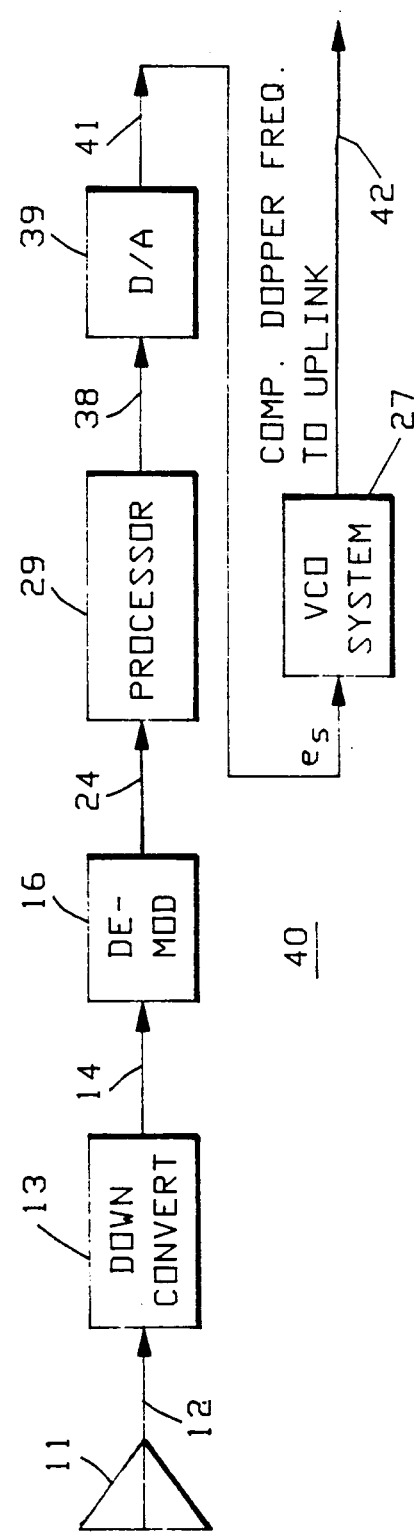

DOPPLER FREQUENCY COMPENSATION CIRCUIT

BACKGROUND OF THE INVENTION

1. Field of the Invention

The present invention is related to a circuit and system for correcting for the doppler frequency effect of a moving airborne station relative to a fixed ground station. More particularly, the present invention relates to a circuit for automatically compensating for the doppler frequency effect between two stations, either or both of which may be moving relative to the other and providing a highly precise real time compensated R.F. carrier signal for uplink transmission to the airborne station.

2. Description of the Prior Art

Heretofore, systems and circuits were known for grossly compensating for the doppler frequency effect that occurs between two stations which are moving relative to each other. Such prior art systems are classified as coherent and non-coherent carrier transmission systems. In the non-coherent carrier transmission system, the receiving station does not require knowledge of the exact frequency or phase of the received signal to demodulate the data properly. Such systems are incapable of providing coherent doppler compensation which is provided by the present invention.

In contrast thereto, in a coherent carrier transmission system, the airborne station is continuously transmitting at a fixed carrier frequency which enables the ground station to coherently lock onto the carrier signal and phase which is arriving at the ground station at a doppler shifted frequency. Since the ground station is locked onto the received down link doppler-shifted carrier frequency, it may coherently and continuously compensate for the doppler effect and transmit a precompensated uplink R.F. carrier frequency signal at a frequency which is equal to the predetermined carrier frequency required for the airborne station, thus substantially reducing the time for acquisition of the R.F. carrier frequency signal at the airborne station.

Heretofore, doppler frequency compensation circuits and systems were capable of producing doppler compensated R.F. carrier frequency signals to the uplink or airborne station, however, such systems only provided a gross estimate of the required R.F. carrier frequency signal and furthermore the compensation circuits had been subject to drift, aging and temperature variations which produce errors in excess of more than one hertz. When such carrier frequency errors occur, it is often necessary for the airborne station to perform a frequency search before it can lock onto the phase of the carrier frequency. Thus, if the R.F. carrier frequency transmitted to the airbone station is in error, the phase-locked loop has to modify the desired predetermined quiescent frequency of the airborne station demodulator's VCO in order to lock onto the received R.F. carrier frequency. Heretofore, the inaccuracies in the prior art doppler frequency compensation circuits and systems have required excessive time for acquisition on the part of the airborne station. While this condition may be acceptable for a single ground station transmitting to a single airborne station, it is extremely important for time division multiple access (TDMA) networks which employ a plurality of ground stations cooperating with a single preferred airborne station. When the data acquisition window must be lengthened to provide for frequency acquisition time, the data throughput to the airborne station is substantially diminished.

Accordingly, it would be extremely desirable to provide a highly accurate doppler frequency compensation system and circuit which does not require frequency search by the airborne station over a plurality of hertz of frequency uncertainty and which permits the airborne station to lock onto the uplink carrier with only a phase transient prior to carrier lock. Such a desirable system would be capable of obtaining frequency lock on the uplink R.F. carrier signal without a frequency search and with no cycle slipping, thus permitting extremely rapid acquisition of the carrier signal and operation at higher carrier frequencies than were heretofore obtainable.

SUMMARY OF THE INVENTION

It is a principal object of the present invention to provide a novel doppler frequency compensation circuit.

It is a principal object of the present invention to provide a doppler frequency compensation circuit which operates in real time without carrier frequency cycle delays.

It is another principal object of the present invention to provide a doppler frequency cycle compensation circuit which is capable of fractional carrier frequency cycle compensation in real time.

It is another principal object of the present invention to provide a doppler frequency compensation circuit which performs cycle-by-cycle coherent fractional frequency compensation.

It is a general object of the present invention to provide a doppler frequency compensation circuit which may be as accurate as the source of reference frequency signals and is not subject to drift, aging and temperature variations.

It is another general object of the present invention to provide a doppler frequency compensation circuit which is not subject to computational errors.

It is another general object of the present invention to provide a doppler frequency compensation circuit which reduces the guard time or acquisition time for lock-on and minimizes the uplink TDMA and/or improves data throughput and/or permits a greater number of stations in a network.

It is another general object of the present invention to provide a doppler frequency compensation circuit for an improved data link system which permits both uplink and downlink stations to continually move while maintaining real time uplink doppler compensation.

It is another general object of the present invention to provide a doppler frequency compensation system which enhances the performance of TDMA networks.

It is another general object of the present invention to provide a doppler frequency compensation circuit having continuous and coherent tracking of the doppler effect which permits a much simpler compensation system than the computational systems used heretofore.

According to these and other objects of the present invention, there is provided a doppler frequency compensation circuit for a data link system of the type having a moving airborne station which generates coherent downlink R.F. signals comprising a carrier signal with data modulated signals thereon for transmission to a ground station. The ground station is provided with a receiver for recovering an I.F. carrier signal from the received coherent signal and is further provided with a compensation circuit comprising a scaling phase-locked loop and an inverting phase-locked loop which produces a uplink R.F. carrier signal corrected for uplink doppler frequency shift at the predetermined carrier frequency of the airborne station.

BRIEF DESCRIPTION OF THE DRAWINGS

FIG. 2 is a block diagram depicting a prior art doppler compensation circuit having a numerical controlled oscillator and is useable for receiving coherent or non-coherent downlink signals;

FIG. 3 is a block diagram depicting another prior art doppler compensation circuit having a voltage controlled oscillator and is useable for receiving coherent and non-coherent downlink signals.

DESCRIPTION OF THE PREFERRED EMBODIMENT

The present invention is preferably used with data link networks of the type which employ a plurality of ground stations or downlink stations and a single uplink or airborne station. Since the airborne and ground station may attempt transmissions at the same time, the downlink signal from the airborne station employs a different carrier frequency from the uplink signal transmitted from one of the plurality of ground stations. When the airborne platform or station transmits a continuous carrier signal, it is possible to implement a coherent receiver in the ground station which continuously tracks the downlink carrier frequency and phase of the received signal. In the absence of a continuous downlink carrier signal, there can be no continuous coherent carrier tracking at the ground station. In a non-coherent system, the ground station must first demodulate the data modulated onto the received signal before making a computation for doppler correction which requires computational time. As will be explained hereinafter, the present system eliminates computational time and further produces a highly accurate doppler frequency compensated R.F. uplink carrier signal which is adapted to match the quiescent frequency of the carrier tracking loop VCO signal in the airborne station.

Figure 1:
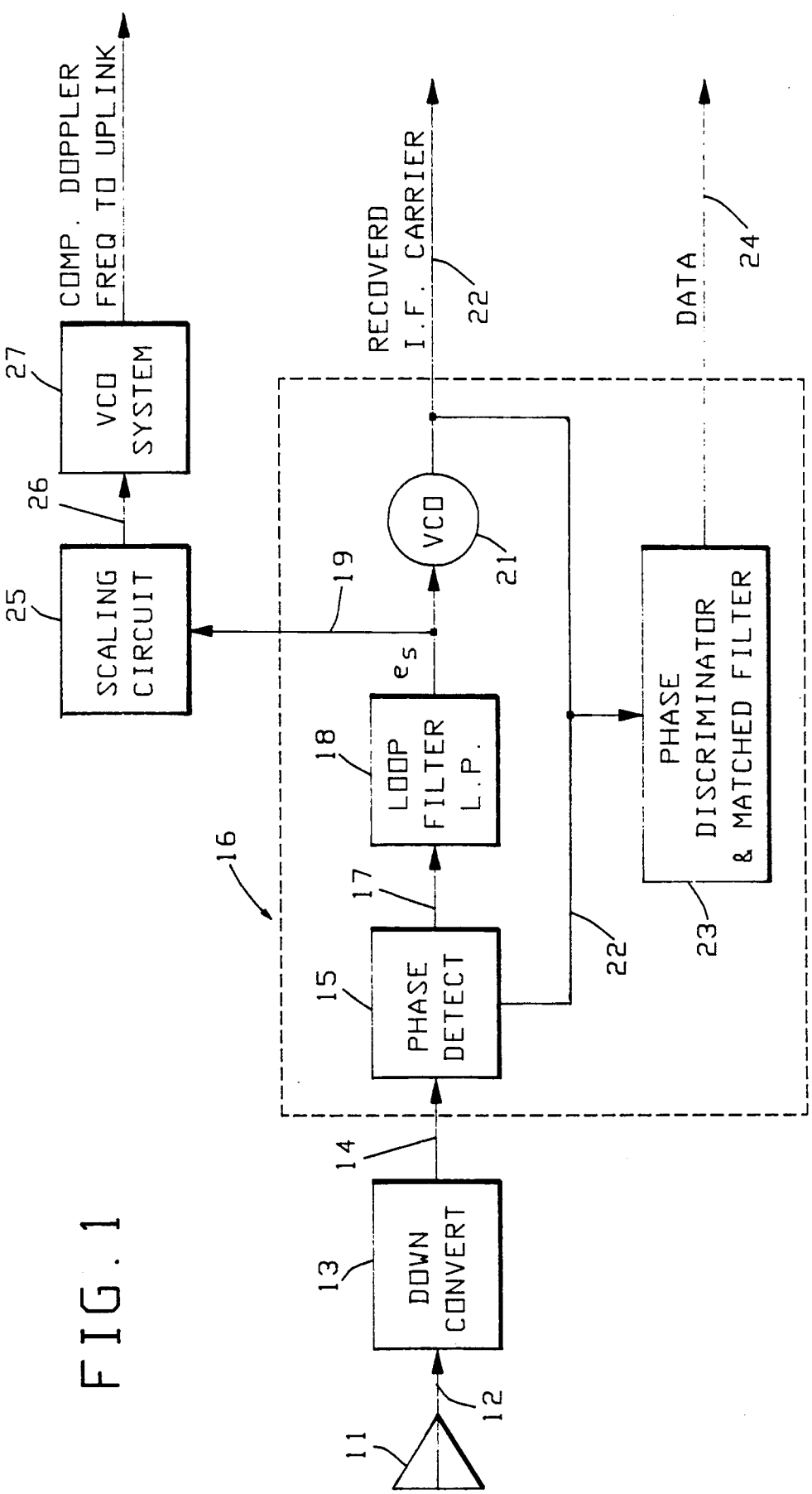
FIG. 1 is a block diagram depicting a prior art doppler compensated circuit of the type used for receiving coherent downlink signals.

Refer now to FIG. 1 showing a block diagram of a prior art doppler compensation circuit. Compensation circuit 10 is shown comprising an antenna 11 for receiving a signal from an airbone station which is applied via line 12 to a down converter 13 for producing a downlink intermediate frequency (I.F.) signal on line 14. The I.F. signal is applied to a phase detector 15 which is part of a coherent demodulator 16 shown in phantom lines. The output of phase detector 15 on line 17 is an unfiltered voltage error signal which is applied to loop filter 18 to produce a desired error signal ($e_s$) on line 19. The error signal on line 19 is applied to a voltage controlled oscillator 21 to produce the desired recovered I.F. carrier signal on line 22 which is fed back in a closed loop to the phase detector 15 and also applied to a phase discriminator and matched filter circuit 23 which strips the data off of the carrier to provide a data signal on line 24. The aforementioned error signal on line 19 is applied to a scaling circuit 25 which is typically implemented as a voltage divider or operational amplifier to produce a voltage output signal on line 26. The analog voltage signal on line 26 is applied to a voltage controlled oscillator system 27 for producing the desired compensated doppler frequency which is used to produce the carrier signal to the uplink modulator on line 28, as will be explained in greater detail hereinafter.

In the prior art system of FIG. 1, the error signal on line 19 and the voltage controlled oscillator system 27 produce drift errors which cause the frequency of the signal on line 28 to vary over a large number of hertz. After such prior art systems were accurately aligned for initial operation, they tend to drift out of alignment over a period of hours, thus creating a compensated doppler frequency signal on line 28 which is highly inaccurate for purposes of the present invention.

Refer now to FIG. 2 showing a block diagram depicting a prior art doppler compensation circuit of the type which may be employed for receiving both coherent or non-coherent downlink signals. Accordingly, the antenna 11, line 12, down converter 13, line 14 and demodulator 16 may be the same as those previously explained with reference to the elements of FIG. 1. The data output of line 24 of the compensation circuit 30 in FIG. 2 is now applied to a processor 29. Processor 29 may be implemented by use of a microprocessor or other type of computer. Embedded in the data stream on line 24 is information which describes the speed, location, altitude and direction of travel which is necessary for the processor to compute the downlink doppler frequency when the ground station location of the processor 29 is known. With the aforementioned information, the processor 29 calculates a digital command produced on line 31 to the numerical controlled oscillator 32 which directs or instructs the oscillator 32 to produce an output frequency on line 33 which is proportional to the downlink doppler frequency embedded in the signal received at antenna 11. The signal on line 33 is a signal whose frequency is proportional to the downlink doppler frequency received at antenna 11. The signal on line 33 is applied to a multiplier/mixer 34 which modifies the frequency signal on line 35 from oscillator 36 and produces the desired compensated uplink doppler frequency on line 37. If the airborne station and the ground station are not moving relative to each other, there is no doppler frequency at antenna 11 but there is always a numerical controlled oscillator frequency on line 33 which, when added to the predetermined oscillator frequency on line 35, produces the nominal I.F. carrier frequency on line 37 that is capable of producing the R.F. carrier frequency, as will be explained hereinafter.

The advantage of the circuit shown in FIG. 2 is that the errors produced in the demodulator 16 as part of the error signal on line 19 are now eliminated. Thus, the circuit of FIG. 2 is less sensitive to errors produced by temperature and aging. However, there are now time lag errors produced by processing time of processor 29 as well as bit errors received in digital form on line 24. As with all computational systems, the processor 29 slows down or is burdened by the number of computations required. When the ground stations of the data link network are moving, all of the information describing the movement of the ground stations must be input to the processor 29 in order for the calculation or correction signal on line 31 to compensate for the doppler shift between the two stations. In any event, the system of FIG. 2 requires the knowledge of the location of the ground station in order to produce an accurate signal on line 31.

Refer now to FIG. 3 showing a block diagram of another prior art doppler compensation circuit for receiving both coherent and non-coherent downlink signals. The doppler compensation circuit 40 is identical to the doppler compensation circuit 30 up through and to the processor 29 and these elements of the circuit 40 are numbered the same and do not require additional explanation. However, the digital output signal from processor 29 on line 38 is a digital-to-analog command signal which differs from the command signal on line 31 of FIG. 2. A digital-to-analog converter 39 converts the command signal on line 38 to an analog signal on line 41 which is an error correction signal ($e_s$) applied to the voltage controlled oscillator system 27 of the type shown in FIG. 1 to produce a compensated doppler frequency signal on line 42. In addition to having all of the bit and delay processor errors associated with the system of FIG. 2, the doppler compensation system 40 also has drift and temperature error signals associated with the VCO system 27, as explained hereinbefore with regards to FIG. 1.

The prior art systems, described hereinbefore with reference to FIGS. 1-3, all produce compensated doppler frequency signals on their output lines 28, 37 and 42, which may be best defined as gross or approximate frequency carrier signals which are incapable of providing doppler compensation within several hertz of the R.F. carrier frequency being transmitted to the airborne station. As will be explained hereinafter, the present invention system provides sufficient accuracy to maintain the uplink R.F. carrier frequency from the ground station to the airborne station within several hertz of the carrier frequency, thus enabling the coherent airborne receiver to lock-on by phase adjustment without employing frequency searching.

Figure 4:
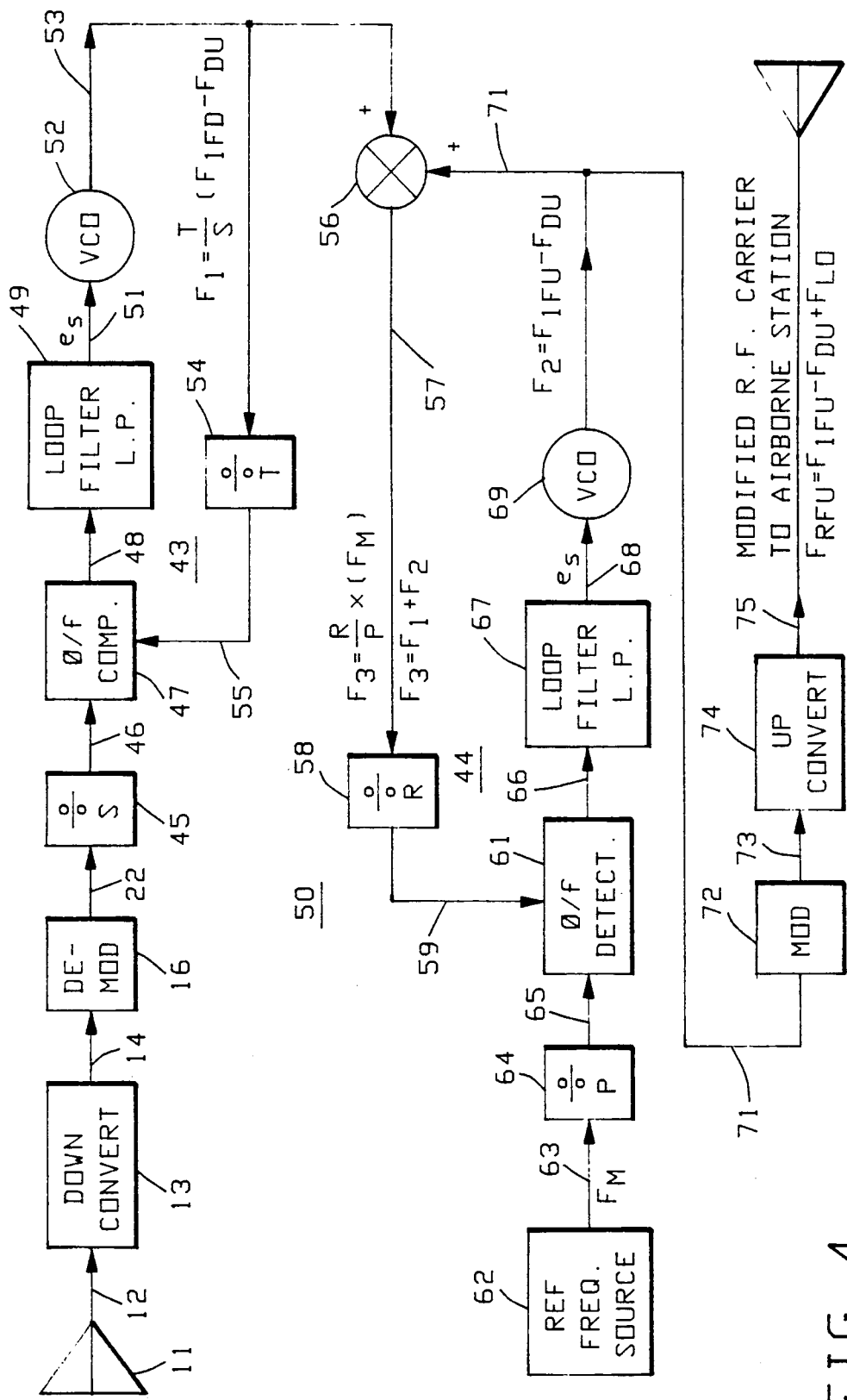
FIG. 4 is a block diagram of the preferred embodiment of the present invention doppler compensation circuit showing a scaling phase-locked loop and an inverting phase-locked loop which is employed for receiving coherent downlink signals and for producing pre-compensated uplink R.F. carrier signals to an airborne station.

Refer now to FIG. 4 showing a block diagram of the preferred embodiment continuously coherent doppler frequency compensation circuit 50. The circuit and system 50 comprises two basic loops. The upper or scaling phase-locked loop 43 is coupled to the lower inverting phase-locked loop 44 and the inverting phase-locked loop 44 provides a pre-compensated I.F. carrier signal which may be employed to generate the pre-compensated uplink R.F. carrier signal at a frequency which, when received by the airborne station, is substantially identical to the quiescent frequency of the airborne receiver carrier recovery loop VCO. The elements 11 to 14 and 16 of FIG. 4 are identical to those previously described with reference to FIG. 1 and do not require additional explanation herein. The output signal on line 22 is the recovered I.F. carrier signal which for purposes of the present invention contains the downlink I.F. frequency plus the downlink doppler frequency shown as $F_{FID}+F_{DD}$ wherein the downlink doppler frequency $F_{DD}$ is equal to $$\frac{S(F_{DU})}{T}$$

where $F_{DU}$ is the uplink doppler frequency and S and T are integers which are calculated for the respective dividers, to be described hereinafter. The recovered I.F. carrier signal on line 22 is applied to an S divider 45 to produce a lower frequency signal on line 46 which is applied to the phase/frequency comparator 47. The comparator 47 provides an unfiltered error signal on line 48 which is applied to the loop filter 49 to produce the filtered corrected error signal $e_s$ on line 51 which is applied to a voltage controlled oscillator 52 to produce the F1 signal on line 53. The F1 signal on line 53 is applied to a second T divider 54 whose reduced frequency output on line 55 is applied to the comparator 47 to produce the aforementioned unfiltered error signal on line 48. The comparator 47 is of the type which first compares the frequency to reduce the possible initial frequency offset between the signals on line 46 and 55 and then compares the phase to produce the error signal on line 48 which is capable of producing the deviation frequency signal F1 on line 53. It will be noted that the deviation frequency signal F1 is equal to $$\frac{T(F_{IFD})}{S} + F_{DU}.$$

By force of system design, the ratio of T to S which are used as integers in the dividers 54 and 45 is the ratio of the uplink R.F. carrier frequency ($F_{RFU}$) divided by the downlink R.F. carrier frequency ($F_{RFD}$). The deviation frequency signal on line 53 is shown applied to mixer or multiplier 56 to produce the frequency F3 on line 57. The F3 frequency on line 57 is reduced to a lower frequency at divide-by-R circuit 58 to provide a reduced frequency signal on line 59 which is applied to the phase-frequency detector 61. A highly accurate source of reference frequency signals 62 produces the $F_M$ signal on line 63 which is applied to the divide-by-P circuit 64 to produce the $F_N$ signal on line 65 which is applied to the detector 61. The detector 61 produces an unfiltered error signal on line 66 which is applied to the loop filter 67 to produce the filtered error signal $e_s$ on line 68 which is applied to the VCO 69 to produce the F2 signal on line 71 which is applied to the mixer 56 to produce the F3 signal on line 57. It will be noted that the F3 signal on line 57 is equal to F1+F2 where F3 is also equal to $$\frac{R(F_M)}{P}$$

which forces the inversion of the scaled down downlink doppler frequency. Stated differently, the downlink doppler frequency signal is scaled by the scaling phase-locked loop 43 and inverted by the inverting phase-locked loop 44 to provide the desirable pre-compensated I.F. carrier signal on line 71 shown as F2 where F2 is equal to $F_{IFU}-F_{DU}$. It will be noted that the term $F_{DU}$ is the uplink doppler frequency component of F2 which is applied to modulator 72 to produce the modulated signal on line 73 which is up converted in converter 74 to produce the uplink R.F. frequency ($F_{RFU}$) on line 75. When the uplink doppler frequency ($F_{DU}$) is applied to the up converter 74, the term now includes a local oscillator frequency in the F2 frequency ($L_{LO}$) so that the uplink doppler frequency compensates for the downlink doppler frequency and the frequency received at the airborne station is equal to $F_{IFU}+F_{LO}$ and the uplink doppler frequency is eliminated.

In the present invention, the greatest source of error is the reference frequency source 62. In the preferred embodiment, a rubidium reference oscillator is employed which reduces the transmitted uplink R.F. carrier frequency uncertainty to less than 1 Hz, thus, enabling near instantaneous lock-on of the coherent demodulator in the airborne receiver. The antenna 76 may be separate or the same antenna as antenna 11 and may be directional or omni-directional.

Having explained a preferred embodiment of the present invention, it will be understood that the airborne station is transmitting omnidirectional continuous coherent carrier signals which enables the doppler frequency compensation circuit in the ground station to continuously track and produce an R.F. signal at antenna 76 which may be near instantaneously locked on by the receiver in the airborne station with only a phase transient and with no cycle slipping prior to carrier lock. Thus, the novel doppler frequency compensation circuit 50 operates continuously and in real time without computational delays.

In the preferred embodiment circuit of FIG. 4, the scaling phase-locked loop 43 may be employed to scale up or scale down depending on the ratio of the uplink and downlink R.F. carrier frequencies. In a preferred embodiment of the type shown in FIG. 4, T was equal to 96 and S was equal to 100, thus providing a scaling ratio of $T/S=0.96$. In the same preferred embodiment, the inverting phase-locked loop employed dividers 58 and 64 where R and P were equal to 1042 and 5, respectively. In this inverting phase-locked loop 44, the I.F. uplink frequency F2 was equal to 1700 MHz and the I.F. downlink frequency was equal to 400 MHz. The F1 frequency on line 53 was equal to 384 MHz and the FM frequency on line 63 was equal to 10 MHz for a reference frequency source.

The loop filter 49 in the scaling phase-locked loop 43 is designed to provide a tracking filter function on the recovered downlink I.F. carrier signal on line 46, thereby substantially reducing the phase noise present on the downlink recovered I.F. carrier at line 22.

Having explained a preferred embodiment of the present invention and the problems associated with the prior art doppler frequency compensation circuits it will be now be appreciated that the prior art circuits are attempting to reduce errors that are produced in their own compensation circuits whereas the present invention recognizing the problem of drift, aging, temperature variations and computational delays completely eliminates the problem associated with the prior art circuits. Stated differently, rather than to treat the problem associated with the prior art circuits, the problem is eliminated.

What is claimed is:

1. A doppler frequency compensation circuit for a data link system comprising:
   a moving airborne station source of coherent downlink R.F. signals comprising a fixed frequency carrier signal and a modulating data signal,
   a ground station for receiving said coherent R.F. signals,
   means in said ground station for recovering an I.F. carrier signal from said received coherent signal which is shifted by the downlink doppler frequency effect,
   a scaling phase-locked loop coupled to said shifted I.F. carrier signals for producing a deviation frequency signal at said ground station which is inversely proportional to an uplink doppler frequency, and
   an inverting phase-locked loop coupled to said deviation frequency signal for producing uplink I.F. doppler frequency compensated signals.

2. A doppler frequency compensation circuit as set forth in claim 1 which further includes a modulator coupled to said I.F. carrier signals and an up converter coupled to said modulator for providing an uplink R.F. carrier signal which includes a doppler frequency compensation signal.

3. A doppler frequency compensation circuit as set forth in claim 1 wherein said coherent downlink R.F. signals are continuous R.F. signals.

4. A doppler frequency compensation circuit as set forth in claim 1 wherein said ground stations move relative to said airborne station and said scaling phase-locked loop and said inverting phase-locked loop automatically compensate for the relative doppler effect of both moving stations without requiring position and velocity information of said ground station.

5. A doppler frequency compensation circuit as set forth in claim 1 wherein said scaling phase-locked loop comprises means for coherently tracking and scaling the downlink I.F. carrier signals.

6. A doppler frequency compensation circuit as set forth in claim 5 wherein said means for coherently tracking said downlink I.F. carrier signals comprises a pair of frequency dividers for producing a scaling ratio equal to the ratio of the uplink airborne station carrier frequency divided by the downlink ground station carrier frequency.

7. A doppler frequency compensation circuit as set forth in claim 5 wherein said scaling phase-locked loop further comprises a tracking loop filter for reducing phase noise in the recovered I.F. carrier signal.

8. A doppler frequency compensation circuit as set forth in claim 1 wherein said inverting phase-locked loop comprises a pair of frequency dividers for producing a doppler compensated uplink R.F. carrier frequency for transmission to said airborne station.

9. A doppler frequency compensation circuit as set forth in claim 8 wherein said inverting phase-locked loop further comprises a highly accurate reference frequency and said frequency dividers are selected to provide a predetermined uplink I.F. carrier frequency when no doppler effect is present on said deviation frequency signal.

10. A doppler frequency compensation circuit as set forth in claim 2 wherein said inverting phase-locked loop comprises a mixer having a predetermined uplink I.F. carrier signal input and said deviation frequency signal input for providing the sum of the two input signals.

11. A doppler frequency compensation circuit as set forth in claim 10 wherein said predetermined uplink I.F. carrier signal is equal to the original base I.F. uplink carrier signal from the ground station minus the uplink doppler frequency.

12. A doppler frequency compensation circuit as set forth in claim 10 wherein said deviation frequency signal F1 to said mixer input is equal to the I.F. carrier frequency downlink $F_{IFD}$ times the ratio T/S of the uplink R.F. carrier frequency signal to the downlink R.F. carrier frequency signal plus the uplink doppler frequency $F_{DU}$.

13. A doppler frequency compensation circuit as set forth in claim 2 wherein said uplink R.F. carrier frequency ($F_{RFU}$) is equal to the uplink I.F. frequency ($F_{IFU}$) plus the frequency of the local oscillator ($F_{LO}$) in the up converter minus the uplink doppler frequency ($F_{DU}$).

14. A doppler frequency compensation circuit as set forth in claim 2 wherein said ground stations comprise a plurality of individual receiving/transmitting stations all transmitting at the same uplink R.F. carrier frequency.

15. A doppler frequency compensation circuit as set forth in claim 14 wherein said individual receiving/transmitting stations continuously receive downlink coherent signals and transmit on a predetermined time division multiple access (TDMA) time slot.

16. A doppler frequency compensation circuit as set forth in claim 15 wherein said time division time slots of individual ground stations are optimized for transmission of data and require a minimum of uplink carrier acquisition time.

* * * * *